United States Patent
Mullins et al.

(10) Patent No.: US 8,637,824 B2
(45) Date of Patent: Jan. 28, 2014

(54) COLD SHIELD FOR A COLD STAGE

(75) Inventors: Richard N. Mullins, Goleta, CA (US); Paul A. Drake, Santa Ynez, CA (US); Mark T. Luke, Goleta, CA (US)

(73) Assignee: Raytheon Company, Waltham, MA (US)

( * ) Notice: Subject to any disclaimer, the term of this patent is extended or adjusted under 35 U.S.C. 154(b) by 336 days.

(21) Appl. No.: 13/010,022

(22) Filed: Jan. 20, 2011

(65) Prior Publication Data

US 2012/0187297 A1 Jul. 26, 2012

(51) Int. Cl.
*G01J 5/02* (2006.01)

(52) U.S. Cl.
USPC .......................................................... 250/352

(58) Field of Classification Search
USPC .......................................................... 250/352
See application file for complete search history.

(56) References Cited

U.S. PATENT DOCUMENTS

| | | | |
|---|---|---|---|
| 4,431,917 A * | 2/1984 | Gibbons | 250/332 |
| 4,555,626 A * | 11/1985 | Suzuki | 250/239 |
| 4,972,085 A * | 11/1990 | Weber et al. | 250/352 |
| 4,995,236 A * | 2/1991 | Rouquier et al. | 62/51.1 |
| 5,075,553 A * | 12/1991 | Noble et al. | 250/352 |
| 5,187,939 A | 2/1993 | Skertic et al. | |
| 5,298,752 A | 3/1994 | Wight | |
| 5,466,943 A | 11/1995 | Green et al. | |
| RE35,333 E * | 9/1996 | Iwasaki et al. | 250/352 |
| 5,563,566 A | 10/1996 | Laskaris et al. | |
| 5,751,473 A * | 5/1998 | Runciman | 359/356 |
| 5,812,309 A | 9/1998 | Thoma et al. | |
| 5,966,945 A | 10/1999 | Mengel et al. | |
| 6,122,919 A * | 9/2000 | Patel et al. | 62/51.1 |
| 6,144,031 A * | 11/2000 | Herring et al. | 250/352 |
| 6,417,514 B1 * | 7/2002 | Eneim et al. | 250/352 |
| 7,253,396 B2 * | 8/2007 | Loiseau | 250/238 |
| 2004/0238741 A1 * | 12/2004 | Gat et al. | 250/338.1 |

* cited by examiner

*Primary Examiner* — David Porta
*Assistant Examiner* — Taeho Jo

(57) ABSTRACT

In certain embodiments, a system may include a sensor platform, a cold shield, and a support system. The sensor platform supports a sensor system. The cold shield allows first radiation to reach the sensor system and prevents second radiation from reaching the sensor system. The support system is coupled to the cold shield and the platform, and supports the cold shield and maintains a separation between the cold shield and the platform.

20 Claims, 2 Drawing Sheets

COLD SHIELD FOR A COLD STAGE

TECHNICAL FIELD

This invention relates generally to the field of sensor systems and more specifically to a cold shield for a cold stage.

BACKGROUND

Certain sensor systems may operate most effectively when cooled to a cryogenic temperature. Accordingly, cooling systems are used to cool the sensor systems.

SUMMARY OF THE DISCLOSURE

In accordance with the present invention, disadvantages and problems associated with previous techniques for cold shields may be reduced or eliminated.

In certain embodiments, a system may include a sensor platform, a cold shield, and a support system. The sensor platform supports a sensor system. The cold shield allows first radiation to reach the sensor system and prevents second radiation from reaching the sensor system. The support system is coupled to the cold shield and the platform, and supports the cold shield and maintains a separation between the cold shield and the platform.

Certain embodiments of the invention may provide one or more technical advantages. A technical advantage of one embodiment may be that a cold shield support maintains a separation between a cold shield and a sensor platform that supports a sensor system. The separation may thermally protect the sensor platform and thus the sensor system from the thermal influence of the cold shield. Another technical advantage of one embodiment may be that the sensor platform need not support the cold shield, and thus may be reduced in size. Another technical advantage of one embodiment may be that the cold shield support may provide a direct cooling path to cool the cold shield. Another technical advantage of one embodiment may be that contraction of the cold shield during cooling may not mechanically distort the sensor system.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
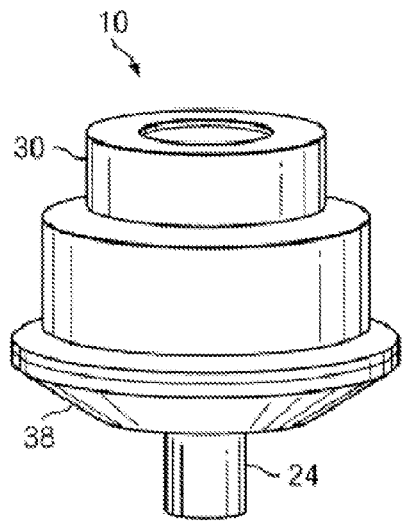
FIGS. 1 and 2 illustrate an example of a cold stage system that includes a cold shield system.
Figure 3:
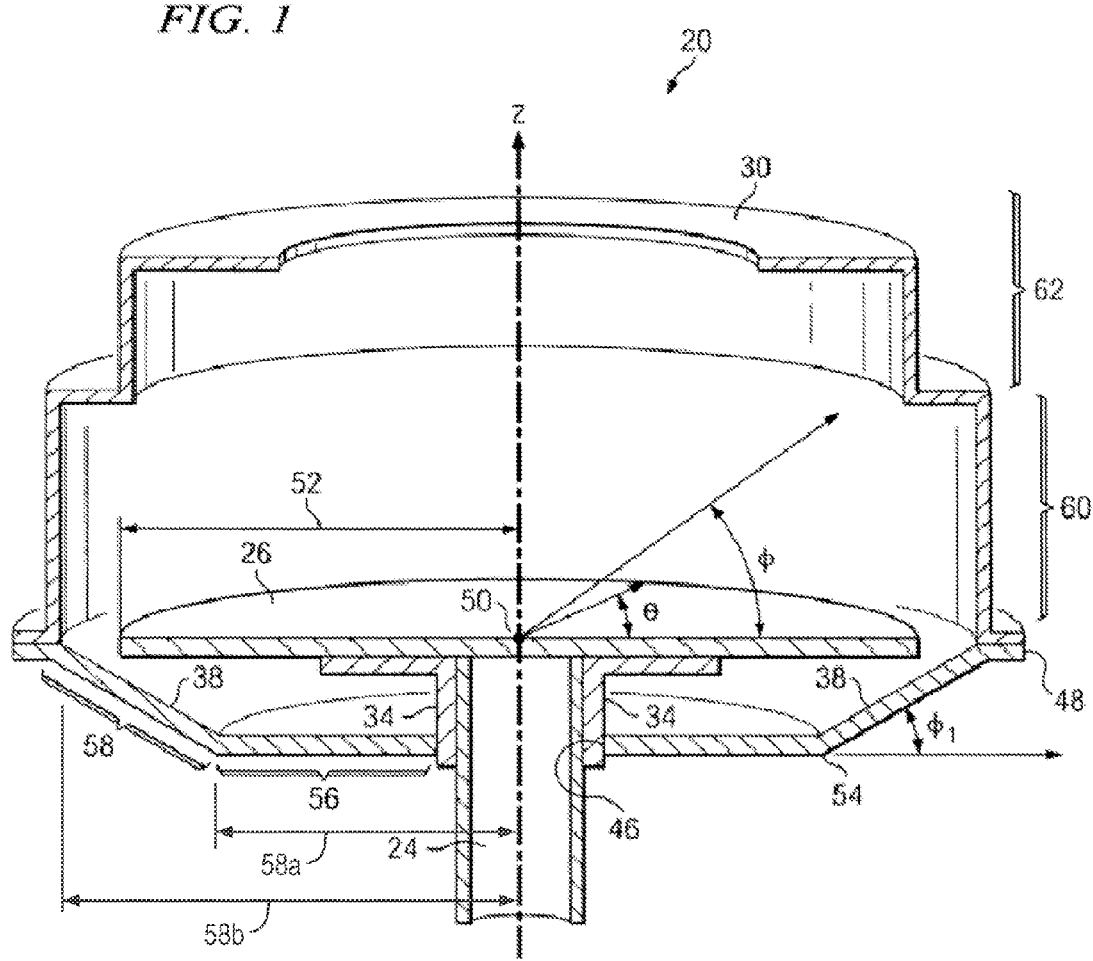
FIG. 3 illustrates an example of a cold shield system.
Figure 2:
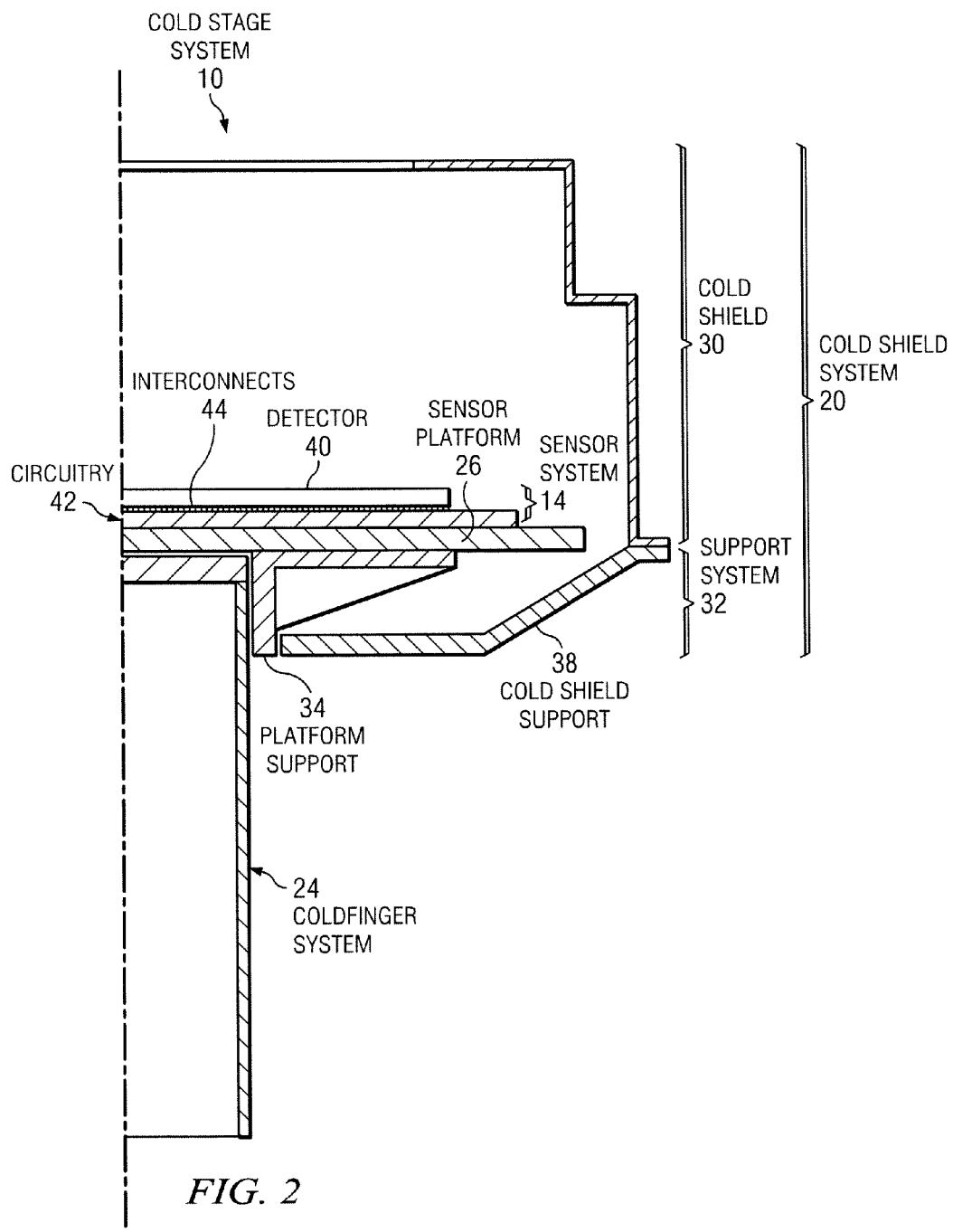

Embodiments of the present invention and its advantages are best understood by referring to FIGS. 1 through 3 of the drawings, like numerals being used for like and corresponding parts of the various drawings.

FIGS. 1 and 2 illustrate an example of a cold stage system 10 that includes a cold shield system 20. In certain embodiments, a system may include a sensor platform 26, a cold shield 30, and a support system 32. Sensor platform 26 supports a sensor system 14. Cold shield 30 allows first radiation to reach sensor system 14 and prevents second radiation from reaching sensor system 14. Support system 32 is coupled to cold shield 30 and sensor platform 26, and supports cold shield 30 and maintains a separation between cold shield 30 and sensor platform 26. The separation may thermally and/or mechanically protect sensor platform 26 and thus sensor system 14 from the thermal and/or mechanical influence of cold shield 30. Sensor platform 26 need not support cold shield 30, and thus may be reduced in size.

Turning to the illustrated example, cold stage system 10 includes a sensor system 14, a sensor platform 26, a cold shield system 20, and a cold finger system 24 coupled as shown. Sensor system 14 includes detectors 40 and circuitry 42 coupled by interconnects 44 as shown. Cold shield system 20 includes a cold shield 30 and a support system 32, which includes a platform support 34 and a cold shield support 38.

Sensor system 14 receives energy (such as infrared (IR) energy) radiated from a scene, and converts the energy into electrical signals as output. In certain embodiments, sensor system 14 may be an infrared sensor system and may operate most effectively when cooled to a cryogenic temperature, for example, approximately the boiling point of liquid nitrogen 77K. Accordingly, sensor system 14 may be operated within cold stage system 10.

In certain embodiments, cold stage system 10 may be operated in a vacuum to provide thermal insulation for sensor system 14 and to avoid condensation or freezing of gases (such as water vapor, oxygen, or nitrogen) on sensor system 14. In certain applications, cold stage system 10 may be disposed within a vacuum enclosure system such as an evacuated dewar system. In certain embodiments, a dewar enclosure may have walls constructed from two or more layers, with a high vacuum maintained between the layers. This may thermally insulate the interior and exterior of the dewar. The vacuum enclosure system may include an insulated vacuum housing having a window through which sensor system 14 views an external scene.

In certain embodiments, sensor system 14 includes any suitable detector 40 and circuitry 42 electrically coupled by any suitable interconnects 44. For example, sensor system 14 may comprise a planar radiation detector and a planar readout circuit coupled by indium bump interconnects. In certain embodiments, detector 40 and circuitry 42 comprise different materials with different coefficients of thermal expansion.

Cold finger system 24 cools platform 26, which in turn cools sensor system 14. A cooler of cold finger system 24 may lower the temperature of platform 26 in any suitable manner. For example, the cooler may use a coolant (such as cold and/or liquefied gas, for example, liquid nitrogen) or mechanical cooling to lower the temperature.

Sensor platform 26 may comprise one or more pieces of material. Sensor platform 26 may comprise any suitable rigid material, such as a metal (for example, titanium, molybdenum, or their alloys) or a ceramic (for example, aluminum nitride, aluminum oxide, or other ceramic oxides, nitrides, or carbides). Sensor platform 26 need not be large, so it can quickly reach an operating temperature.

In certain embodiments, a platform support 34 supports platform 26. Platform support 34 may comprise any suitable rigid material, such as a ceramic material (for example, aluminum oxide or nitride). In certain embodiments, platform support 34 may be coupled to cold finger system 24 and may, along with cold finger system 24, form a level area on which platform 26 may be placed.

Cold shield system 20 may comprise one or more components to prevent second radiation from reaching sensor system 14. In certain embodiments, cold shield system 20 may comprise a cold shield 30 and a support system 32, which may include a cold shield support 38 and/or a platform support 34.

Cold shield 30 protects sensor system 14 from unwanted heating by thermal radiation or light. In certain embodiments, cold shield 30 allows first radiation to reach the sensor system and prevents second radiation from reaching the sensor system. For example, cold shield 30 may allow thermal radiation inside of the optical field of view of sensor system 14 (first radiation) to reach sensor system 14 and may prevent thermal radiation outside of the optical field of view (second radiation) from reaching sensor system 14. Cold shield 30 may be a cooled object with low absorption and high reflectivity. Cold shield 30 may comprise any suitable material, such as a metal, for example, aluminum, nickel, copper, and/or other metal.

Support system 32 is coupled to cold shield 30 and sensor platform 26, and supports cold shield 30 and maintains a separation between cold shield 30 and sensor platform 26. The separation may thermally and mechanically isolate cold shield 30 and sensor platform 26 such that sensor platform 26 is not thermally or mechanically influenced by cold shield 30. Any suitable separation that provides the thermal-mechanical isolation may be used, such as greater than 0.5, 0.5 to 1, or greater than 1 centimeter (cm). In certain embodiments, cold shield support 38 may provide a direct cooling path to cool cold shield 30.

The components of cold stage system 10 may have any suitable size and shape. In certain embodiments, the size and shape may depend at least in part on the size and shape of sensor system 14. Platform 26 may have a size and shape that accommodates sensor system 14. Cold finger system 24 may have a cylindrical shape, and platform support 34 may have an annular, conical shape that wraps around cold finger system 24 and supports platform 26. Cold shield 30 may have a size and shape that protects sensor system 14 from thermal background radiation outside the optical field of view of sensor system 14. Support system 32 may have any suitable size and shape to maintain a separation between cold shield 30 and sensor platform 26. An example is described with reference to FIG. 3.

FIG. 3 illustrates an example of a cold shield system 20. In the example, a planar surface (either top or bottom surface) of sensor platform 26 defines a plane, the center of sensor platform 26 defines a center point 50 and a perpendicular z-axis, and any radius of sensor platform 26 defines zero radius having a distance 52. An azimuth angle θ is measured from the zero radius along the plane, and an inclination angle Φ is measured from the plane to the z-axis.

In the example, cold shield support 38 has a substantially annular shape about center point 50. Cold shield support 38 may be cone shaped, such that the inner diameter 46 of support 38 may be lower on the z-axis than the outer diameter 48. Cold shield support 38 may have a circular bend 54 about the center point. In certain embodiments, bend 54 may separate support 38 into an inner portion 56 and an outer portion 58. It can be seen that a portion of the outer portion 58 has a distance 58a measured from the central axis that is greater than the distance 52 of the sensor platform 26. Additionally, it can be seen that another portion of the outer portion 58 also has a distance 58b measured from the central axis that is less than the distance 52 of the sensor platform 26. In certain embodiments, the angle of inclination of inner portion 56 may be less than that of outer portion 58. For example, inner portion 56 may be substantially parallel to platform 26, and outer portion 58 may be at an inclination angle $\Phi_1$ of 30 to 60 or greater than 60 degrees.

In the example, cold shield 30 may have a first portion 60 and second portion 62. First portion 60 may have a substantially cylindrical shape. First portion 60 may prevent radiation from a substantially 360 degree azimuth angle range from reaching sensor system 14. Second portion 62 may have a substantially annular shape. Second portion 62 may allow radiation from inside of an optical field of view of sensor system 14 to reach sensor system 14, but may prevent radiation from outside of the field of view from reaching sensor system 14. For example, if the optical field of view of sensor system 14 is x degrees, second portion 62 may pass through radiation from inside of x degrees, but may block radiation from outside of x degrees.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. For example, the operations of cold shield 30 and cold shield support 38 may be performed by one component, or the operations of cold shield support 38 may be performed by more than one component. Components of the systems and apparatuses may be coupled together using any suitable technique, such as adhesives, mechanical connectors, and/or magnetic connectors. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. An apparatus comprising:
   a sensor platform configured to support a sensor system, the sensor platform having a central axis, and the sensor platform extending a distance from the central axis;
   a cold shield configured to:
     allow first radiation to reach the sensor system; and
     prevent second radiation from reaching the sensor system; and
   a support system coupled to the cold shield and the sensor platform, the support system including a cold shield support having a portion that extends at an inclination angle from a distance measured from the central axis that is less than the distance of the sensor platform to a distance measured from the central axis that is greater than the distance of the sensor platform, the cold shield support configured to:
     support the cold shield; and
     thermally separate the cold shield from the sensor platform.

2. The apparatus of claim 1, wherein the sensor system comprises an infrared sensor.

3. The apparatus of claim 1, wherein the support system further comprises:
   a platform support coupled to the cold shield support, the platform support configured to support the sensor platform.

4. The apparatus of claim 1, wherein the support system is coupled to a cold finger system configured to cool the sensor platform.

5. The apparatus of claim 1, wherein the cold shield support has a substantially annular shape.

6. The apparatus of claim 1, wherein the portion of the cold shield support that extends from the distance measured from the central axis that is less than the distance of the sensor platform to the distance measured from the central axis that is greater than the distance of the sensor platform is shaped as a frustum of a cone.

7. The apparatus of claim 1, wherein the support system comprises a metal material.

8. The apparatus of claim 1, wherein the cold shield is configured to prevent the second radiation from a substantially 360 degree azimuth angle range from reaching the sensor system, the azimuth angle range in a sensor plane defined by the sensor system.

9. The apparatus of claim 1, wherein the cold shield is configured to prevent the second radiation from outside of an optical field of view of the sensor system from reaching the sensor system.

10. An apparatus comprising:
a sensor platform configured to support a sensor system, the sensor system comprising an infrared sensor, the sensor platform having a central axis, and the sensor platform extending a distance from the central axis;
a cold shield configured to:
allow first radiation to reach the sensor system; and
prevent second radiation from reaching the sensor system; and
a support system coupled to the cold shield and the sensor platform, the support system including a cold shield support coupled to the cold shield, the cold shield support having a portion that extends at an inclination angle from a distance measured from the central axis that is less than the distance of the sensor platform to a distance measured from the central axis that is greater than the distance of the sensor platform, the cold shield support configured to:
support the cold shield; and
thermally separate the cold shield from the sensor platform.

11. The apparatus of claim 10, the support system further comprises:
a platform support configured to support the sensor platform.

12. The apparatus of claim 10, wherein the support system is coupled to a cold finger system configured to cool the sensor platform.

13. The apparatus of claim 10, wherein the portion of the cold shield support that extends from the distance measured from the central axis that is less than the distance of the sensor platform to the distance measured from the central axis that is greater than the distance of the sensor platform is shaped as a frustum of a cone.

14. The apparatus of claim 10, wherein the cold shield is configured to prevent the second radiation from a substantially 360 degree azimuth angle range from reaching the sensor system, the azimuth angle range in a sensor plane defined by the sensor system.

15. The apparatus of claim 10, wherein the cold shield is configured to prevent the second radiation from outside of an optical field of view of the sensor system from reaching the sensor system.

16. An apparatus comprising:
a support system comprising:
a platform support configured to support a sensor platform, the sensor platform configured to support a sensor system, the sensor platform having a central axis, and the sensor platform extending a distance from the central axis; and
a cold shield support coupled to the platform support, the cold shield support having a portion that extends at an inclination angle from a distance measured from the central axis that is less than the distance of the sensor platform to a distance measured from the central axis that is greater than the distance of the sensor platform, the cold shield support configured to:
support a cold shield, the cold shield configured to allow first radiation to reach the sensor system and prevent second radiation from reaching the sensor system; and
thermally separate the cold shield from the sensor platform.

17. The apparatus of claim 16, wherein the sensor system comprises an infrared sensor.

18. The apparatus of claim 16, wherein the support system is coupled to a cold finger system configured to cool the sensor platform.

19. The apparatus of claim 16, wherein the portion of the cold shield support that extends from the distance measured from the central axis that is less than the distance of the sensor platform to the distance measured from the central axis that is greater than the distance of the sensor platform is shaped as a frustum of a cone.

20. The apparatus of claim 16, wherein the cold shield is configured to prevent the second radiation from outside of an optical field of view of the sensor system from reaching the sensor system.

\* \* \* \* \*